United States Patent
Shi (10) Patent No.: US 9,841,543 B2
(45) Date of Patent: Dec. 12, 2017

(54) IMAGING LENS ASSEMBLY

(71) Applicant: Rongbao Shi, Shenzhen (CN)

(72) Inventor: Rongbao Shi, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/070,153

(22) Filed: Mar. 15, 2016

(65) Prior Publication Data

US 2017/0031137 A1     Feb. 2, 2017

(30) Foreign Application Priority Data

Jul. 31, 2015   (CN) .......................... 2015 1 0465426

(51) Int. Cl.
*G02B 15/14*     (2006.01)
*G02B 5/20*      (2006.01)
*G02B 15/177*    (2006.01)

(52) U.S. Cl.
CPC ............. *G02B 5/20* (2013.01); *G02B 15/177* (2013.01)

(58) Field of Classification Search
CPC .. G02B 13/0065; G02B 15/14; G02B 15/177; G02B 13/009; G02B 9/60; G02B 1/04; G02B 5/20; G02B 5/04
USPC ................. 359/684, 682, 678, 679
See application file for complete search history.

(56) References Cited

U.S. PATENT DOCUMENTS

| 2009/0002846 A1* | 1/2009 | Souma ................. G02B 15/177 359/695 |
| 2010/0014169 A1* | 1/2010 | Tamura ................. G02B 15/177 359/686 |

* cited by examiner

*Primary Examiner* — Alicia M Harrington
(74) *Attorney, Agent, or Firm* — Na Xu; IPro, PLLC (57) ABSTRACT

An imaging lens assembly is provided in the present disclosure. The imaging lens assembly includes a front fixing unit with a first lens, a triangular prism, a magnification unit with a second lens, an aperture stop, a compensation unit with a third lens and a fourth lens, and an object lens unit with a fifth lens, which are arranged in that order along an light incident direction. The triangular prism is configured for changing a light transmitting direction, the magnification unit and the compensation unit are configured for performing continuous focal length switching, and the object lens unit is configured for performing focusing in different distance conditions. The first lens is a meniscus convex lens, the second lens is a biconvex positive lens, the third lens is a biconcave lens, the fourth lens is a meniscus convex lens, and the fifth lens is a biconvex lens.

5 Claims, 7 Drawing Sheets

IMAGING LENS ASSEMBLY

FIELD OF THE DISCLOSURE

The present invention relates to optical technologies, and more particular, to an imaging lens assembly applicable to a small-size imaging apparatus.

BACKGROUND

Imaging apparatuses are widely used in handheld terminal devices such as digital cameras, smart phones, tablet computers, or the like. A typical image apparatus includes an imaging lens assembly for performing imaging function, and the imaging lens assembly is normally consisted of a front fixing unit, a magnification unit, a compensation unit and a back fixing unit. However, the above-mentioned imaging lens assembly has a long mechanical length due to a complicated structure thereof, and thus is inapplicable to a small-size imaging apparatus.

Accordingly, an improved imaging lens assembly which can overcome the disadvantages described above is desired.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present invention will hereinafter be described in detail with reference to several embodiments.

Figure 1:
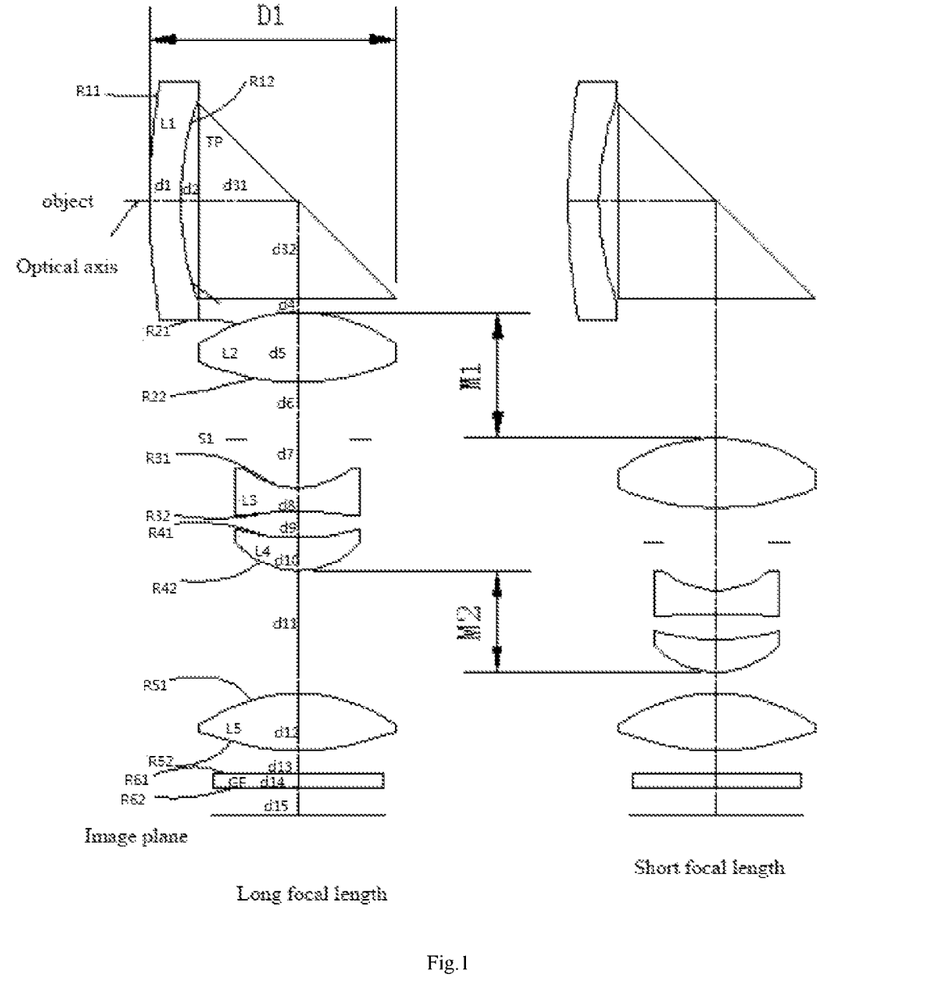
FIG. 1 is a schematic view of an imaging lens assembly according to a first embodiment of the present disclosure.

Referring to FIG. 1, an imaging lens assembly according to a first embodiment of the present disclosure is shown. The image lens assembly includes a front fixing unit with a first lens L1, a triangular prism TP, a magnification unit with a second lens L2, an aperture stop S1, a compensation unit with a third lens L3 and a fourth lens L4, an object lens unit with a fifth lens L5 and a glass filter GF, which are arranged in that order along a light incident direction.

The triangular prism TP is configured for changing a light transmitting direction in the image lens assembly, the magnification unit and the compensation unit are movable and configured for performing continuous focal length switching (i.e., zooming), and the object lens unit is configured for performing focusing in different distance conditions, and with this arrangement the image lens assembly has a continuous zooming configuration with a fixed optical length. In particular, the first lens L1 may be a meniscus convex glass lens, the second lens L2 may be a biconvex positive lens, the third lens L3 may be a biconcave lens, the fourth lens L4 may also be a meniscus convex lens, and the fifth lens L5 may also be a biconvex lens.

Specifically, the first lens L1 has negative focal power and may be made of glass; in addition, an object side (i.e., a front side) of the first lens L1 is convex, while an image side (i.e., a back side) thereof is concave. The second lens L2 has positive focal power and may be made of plastic; and both the object side and the image side of the second lens L2 are convex. The compensation unit has negative focal power; in the compensation unit, the third lens L3 has focal power and may be made of plastic, and both the object side and the image side of the third lens L3 are concave; the fourth lens L4 also has focal power and may be made of glass, and an object side of the fourth lens L4 is concave, while an image side thereof is convex. The fifth lens L5 has positive focal power and may be made of plastic, and both the object side and the image side of the fifth lens L5 are convex. Moreover, each of the second lens L2, the third lens L3 and the fifth lens L5 may has a aspherical surface to ensure the imaging lens assembly to have a better aberration.

The imaging lens assembly as provided in the present disclosure satisfies the following condition formulae (1) and (2):

$$1.8 < F/\#s < 2.5 \tag{1}$$

$$2.8 < F/\#l < 3.2 \tag{2}$$

In the above condition formulae (1) and (2),

F/#s refers to an F-number of a short focal length optical system;

F/#l refers to an F-number of a long focal length optical system.

The condition formulae (1) and (2) define the F-numbers of the short focal length optical system and the long focal length optical system; and thus, when the imaging lens assembly satisfies the range defined by the condition formulae (1) and (2), an imaging performance of the imaging lens assembly in a dark background can be improve; in addition, values approaching to minimum limits of the condition formulae (1) and (2) may be preferred.

The imaging lens assembly as provided in the present disclosure also satisfies the following condition formulae (3) to (5):

$$1.75 \leq nTP \leq 1.85 \tag{3}$$

$$1.6 \leq n3 \leq 1.66 \tag{4}$$

$$20.5 \leq v3 \leq 23 \tag{5}$$

In the above condition formulae (3) to (5), nTP refers to a refractive index of the triangular prism TP;

n3 refers to a refractive index of the third lens L3; and v3 refers to a dispersion coefficient of the third lens L3.

The condition formula (3) defines the refractive index of the triangular prism TP; in the range defined by the condition formula (3), an imaging range of the imaging lens assembly can be expanded by increasing a light incident angle, and a value approaching the maximum limit is preferred. If the value is less than the minimum limit, the light incident angle is restricted and thus it is difficult to expand the imaging range; in contrast, if the value exceeds the maximum limit, optional material of the triangular prism TP is limited, which may increase a cost of the imaging lens assembly.

The condition formulae (4) and (5) define the refractive index and the dispersion coefficient of the third lens L3. In the ranges defined by the condition formulas (4) and (5), chromatic aberration can be corrected more easily and the imaging performance of the imaging lens assembly can be improved; a refractive index value approaching the maximum limit of the condition formulae (4) is preferred, while a dispersion coefficient value approaching the minimum limit of the condition formulae (5) is preferred.

If the refractive index value is less than the minimum limit of the condition formulae (4), or the dispersion coefficient value exceeds the maximum limit of the condition formulae (5), correction of the chromatic aberration may be difficult and this may impact the imaging performance of the imaging lens assembly. In contrast, if the refractive index value exceeds the maximum limit of the condition formulae (4), or the dispersion coefficient value is less than the minimum limit of the condition formulae (5), optional material of the third lens L3 is limited, which may increase the cost of the imaging lens assembly.

The imaging lens assembly as provided in the present disclosure also satisfies the following condition formulae (6) and (7):

$$0.32<|f2/f34|<0.50 \quad (6);$$

$$1.55<|fl/fs|<3.55 \quad (7);$$

In the above condition formulae (6) and (7),
f2 refers to a focal length of the magnification unit;
f34 refers to a focal length of the compensation unit;
fl refers to a focal length of the long focal length optical system;
fs refers to a focal length of the short focal length optical system.

The condition formula (6) defines an absolute ratio of the focal length of the magnification unit to the focal length of the compensation unit; in the range defined by the condition formula (6), the focal power of the magnification unit and the compensation unit is distributed more appropriately, and thus a field curvature of the imaging lens assembly can be controlled effectively.

The condition formula (7) defines an absolute ratio of the focal length of the long focal length optical system to the focal length of the short focal length optical system.

The imaging lens assembly as provided in the present disclosure also satisfies the following condition formulae (8) and (9):

$$D1<10 \text{ mm} \quad (8);$$

$$BF<6 \text{ mm} \quad (9);$$

In the above condition formulae (8) and (9),
D1 refers to an overall lateral distance from the first lens L1 of the front fixing unit to a turning part of the triangular prism TP; and
BF refers to a back focal length of the imaging lens assembly.

The condition formulae (8) and (9) respectively define the overall lateral distance from the first lens L1 to the turning part of the triangular prism TP and the back focal length of the imaging lens assembly. If the values exceed the maximum values defined by either the condition formula (8) or the condition formula (9), miniaturization of the imaging lens assembly is difficult.

The imaging lens assembly as provided in the present disclosure also satisfies the following condition formulae (10) and (11):

$$M1<11 \text{ mm} \quad (10);$$

$$M2<6 \text{ mm} \quad (11);$$

In the above condition formulae (10) and (11),
M1 refers to a motion distance of the magnification unit; and
M2 refers to a motion distance of the compensation unit.

The condition formulae (10) and (11) respectively define the motion distances of the magnification unit and the compensation unit. If the values exceed the maximum values defined by either the condition formula (10) or the condition formula (11), the miniaturization of the imaging lens assembly is difficult, and a stability of the imaging lens assembly is low.

The following description describes the imaging lens assembly in detail with reference to several embodiments; parameters of the imaging lens assembly are defined as follows, in which the unit of each of the distance, radius, and central thickness is millimeter (mm):
f: the focal length of the imaging lens assembly;
f2: the focal length of the second lens L2;
f34: the focal length of the magnification unit, i.e., an assembly formed by the third lens L3 and the fourth lens L4;
f3: the focal length of the third lens L3;
Fno: F-number;
S1: aperture stop;
R: curvature radius of an optical surface, and may also be a central curvature radius of a lens;
R11: curvature radius of the object side surface of the first lens L1;
R12: curvature radius of the image side surface of the first lens L1;
R21: curvature radius of the object side surface of the second lens L2;
R22: curvature radius of the image side surface of the second lens L2;
R31: curvature radius of the object side surface of the third lens L3;
R32: curvature radius of the image side surface of the third lens L3;
R41: curvature radius of the object side surface of the fourth lens L4;
R42: the curvature radius of the image side surface of the fourth lens L4;
R51: curvature radius of the object side surface of the fifth lens L5;
R52: curvature radius of the image side surface of the fifth lens L5;
R61: curvature radius of the object side surface of the glass filter GF;
R62: curvature radius of the image side surface of the glass filter GF;
d: axial thickness of the lens, or distance between lenses;
d1: axial thickness of the first lens L1;
d2: axial distance between the image side surface of the first lens L1 and the object side surface of the triangular prism TP;
d31: lateral central thickness of the triangular prism TP;
d32: longitudinal central thickness of the triangular prism TP;

d4: axial distance between the image side surface of the triangular prism TP and the object side surface of the second lens L2;

d5: axial thickness of the second lens L2;

d6: axial distance between the image side surface of the second lens L2 and the aperture stop S;

d7: axial distance between the aperture stop S1 and the object side surface of the third lens L3;

d8: axial thickness of the third lens L3;

d9: axial distance between the image side surface of the third lens L3 and the object side surface of the fourth lens L4;

d10: axial thickness of the fourth lens L4;

d11: axial distance between the image side surface of the fourth lens L4 and the object side surface of the fifth lens L5;

d12: axial thickness of the fifth lens L5;

d13: axial distance between the image side surface of the fifth lens L5 and the object side surface of the glass filter GF;

d14: axial thickness of the glass filter GF;

d15: axial distance between the image side surface of the glass filter GF and the image plane;

nd: d line refraction index n1: d line refraction index of the first lens L1;

nTP: d line refraction index of the triangular prism TP;

n2: d line refraction index of the second lens L2;

n3: d line refraction index of the third lens L3;

n4: d line refraction index of the fourth lens L4;

n5: d line refraction index of the fifth lens L5;

n6: d line refraction index of the glass filter GF;

vd: abbe number (i.e., dispersion coefficient)

v1: abbe number of the first lens L1;

vTP: abbe number of the triangular prism TP;

v2: abbe number of the second lens L2;

v3: abbe number of the third lens L3;

v4: abbe number of the fourth lens L4;

v5: abbe number of the fifth lens L5;

v6: abbe number of the glass plate GF;

M1: the motion distance of the magnification unit; and

M2: the motion distance of the compensation unit.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (12)$$

In the above condition formulae (12), R refers to axial curvature radius, k refers to the conic coefficient, and A4, A6, A8, A10, A12, A14 and A16 are the aspherical coefficients.

Optionally, aspherical surfaces of the lenses L1-L5 may be obtained according to condition formulae (12); alternatively, the aspherical surface may also be obtained according to other conditions.

Embodiment 1

FIG. 1 illustrated an imaging lens assembly in accordance with a first embodiment of the present disclosure. TABLE 1 and TABLE 2 show the detailed optical data of imaging lens assembly. The optical data in TABLE 1 includes curvature radius, axial thickness, axial distance between lenses (short focal length optical system), refraction index and abbe number of both the surfaces of the lenses L1 to L5, the triangular prism TP and the glass filter GF.

TABLE 1

| | R | d | | nd | | vd | |
|---|---|---|---|---|---|---|---|
| R11 | 61.24 | d1= | 1.1 | n1 | 1.639 | v1 | 55.450 |
| R12 | 6.5721 | d2= | 1.34 | | | | |
| TP | | d31= | 3.8 | nTP | 1.804 | vTP | 46.500 |
| | | d32= | 3.8 | | | | |
| | | d4= | 7.44 | | | | |
| R21 | −6.52 | d5= | 2.17 | n2 | 1.618 | v2 | 55.950 |
| R22 | 10.27 | d6= | 1.86 | | | | |
| S1 | ∞ | d7= | 2.13 | | | | |
| R31 | 3.21 | d8= | 0.5 | n3 | 1.651 | v3 | 21.51 |
| R32 | −19.59 | d9= | 0.49 | | | | |
| R41 | 9.16 | d10= | 1.34 | n4 | 1.603 | v4 | 38.030 |
| R42 | 3.15 | d11= | 0.59 | | | | |
| R51 | −8.73 | d12= | 1.68 | n5 | 1.525 | v5 | 55.950 |
| R52 | 22.89 | d13= | 4.83 | | | | |
| R61 | ∞ | d14= | 0.55 | n6 | 1.517 | v6 | 64.167 |
| R62 | ∞ | d15= | 0.568 | | | | |

In TABLE 1, d4=0.36, d11=6.12, d13=4.5 in the long focal length optical system.

The optical data in TABLE 2 includes conic coefficient (C-coefficient) and aspherical coefficient of the lenses L1 to L5, the triangular prism TP and the glass filter GF.

TABLE 2

| | C-coefficient | aspherical coefficient | | | | |
|---|---|---|---|---|---|---|
| | k | A4 | A6 | A8 | A10 | A12 |
| R21 | 1.4143E−01 | −9.5365E−05 | 4.3314E−05 | −5.9095E−06 | 4.9942E−07 | −1.7550E−08 |
| R22 | −9.5366E+00 | 1.6855E−04 | 1.6575E−05 | −4.2721E−06 | 3.1630E−07 | −1.0767E−08 |
| R31 | 8.6335E−01 | −5.8710E−03 | 1.9498E−03 | −4.2029E−04 | 2.0327E−05 | 3.6781E−12 |
| R32 | −1.6966E+01 | −4.4763E−03 | 2.2001E−03 | −4.6912E−04 | 5.6218E−05 | −2.8286E−06 |
| R51 | 2.1238E+00 | 6.9516E−04 | 1.2378E−05 | −5.0523E−07 | | |
| R52 | 1.7135E+01 | 1.6709E−04 | 8.2254E−06 | −2.0283E−06 | | |

The relevant optical data of the imaging lens assembly in the first embodiment and the values defined in the aforesaid condition formulae (1) to (11) are shown in TABLE 5 as provided in the subsequent paragraphs. As can be seen in TABLE 5, the imaging lens assembly in the first embodiment satisfies the aforesaid condition formulae (1) to (11).

In the first embodiment, the F-number of the imaging lens assembly is in a range from 2.4 to 3.0, the focal length is in a range from 4.92 to 9.84, the full field angle is in a range from 35° to 60°, the refraction index of the triangular prism TP is 1.804, which is capable of reflecting incident light with an incident angle greater than 33.66° to improve the imaging range of the imaging lens assembly.

Furthermore, in the first embodiment, the focal power of the front fixing unit (the first lens L1) is negative, the focal power of the magnification unit (the second lens L2) is positive, the focal power of the compensation unit (the third lens L3 and the fourth lens L4) is negative, and the focal power of the fifth lens L5 is positive. With this configuration, when the imaging lens assembly operates in a zooming process, i.e., converting from a short focal length to a long focal length, the magnification unit (the second lens L2) moves towards the triangular prism TP gradually, and the compensation unit (the third lens L3 and the fourth lens L4) moves away from the image plane gradually.

Figure 2:
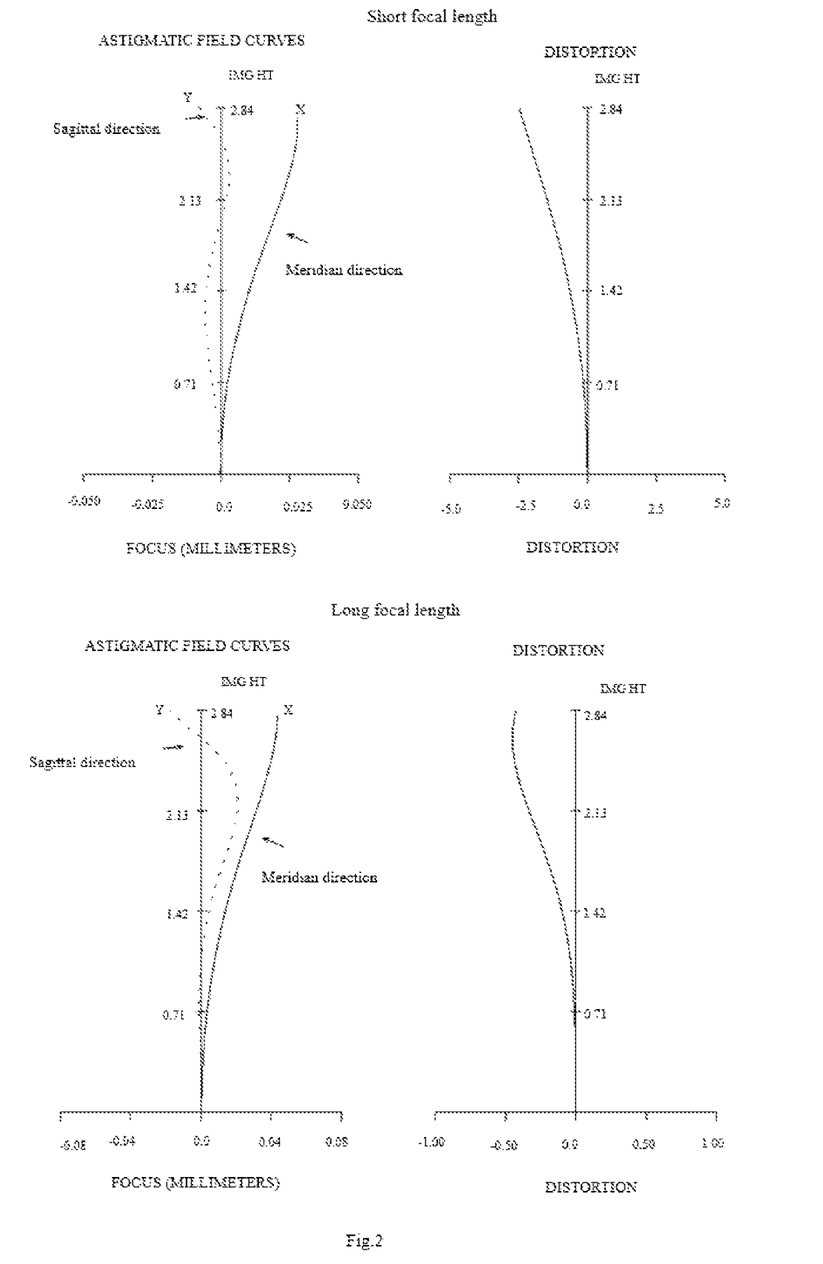
FIG. 2 schematically illustrates field curvature and distortion of the imaging lens assembly of FIG. 1.
Figure 3:
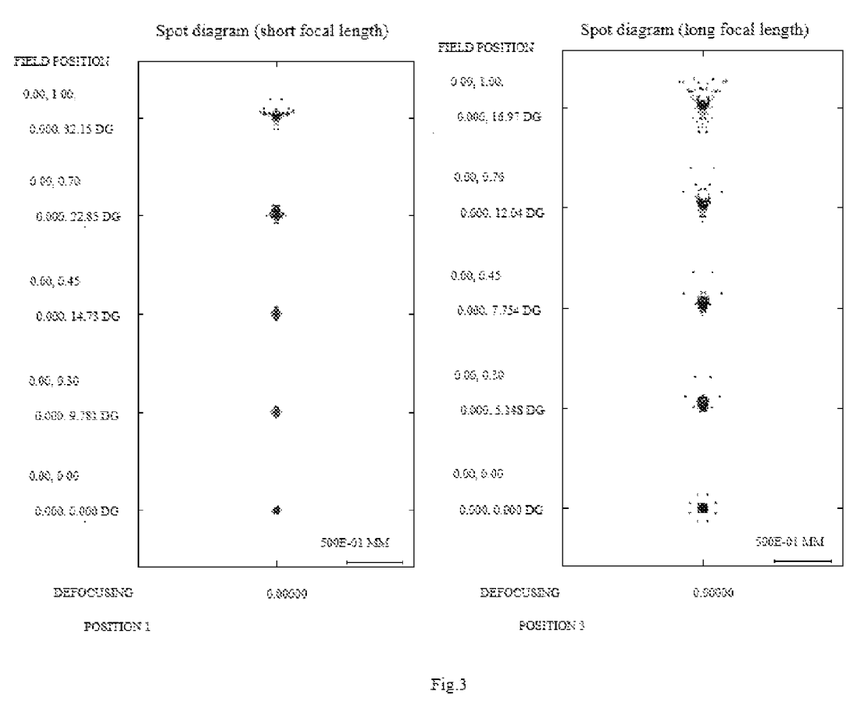
FIG. 3 schematically illustrates a spot diagram of the imaging lens assembly of FIG. 1.
Figure 4:
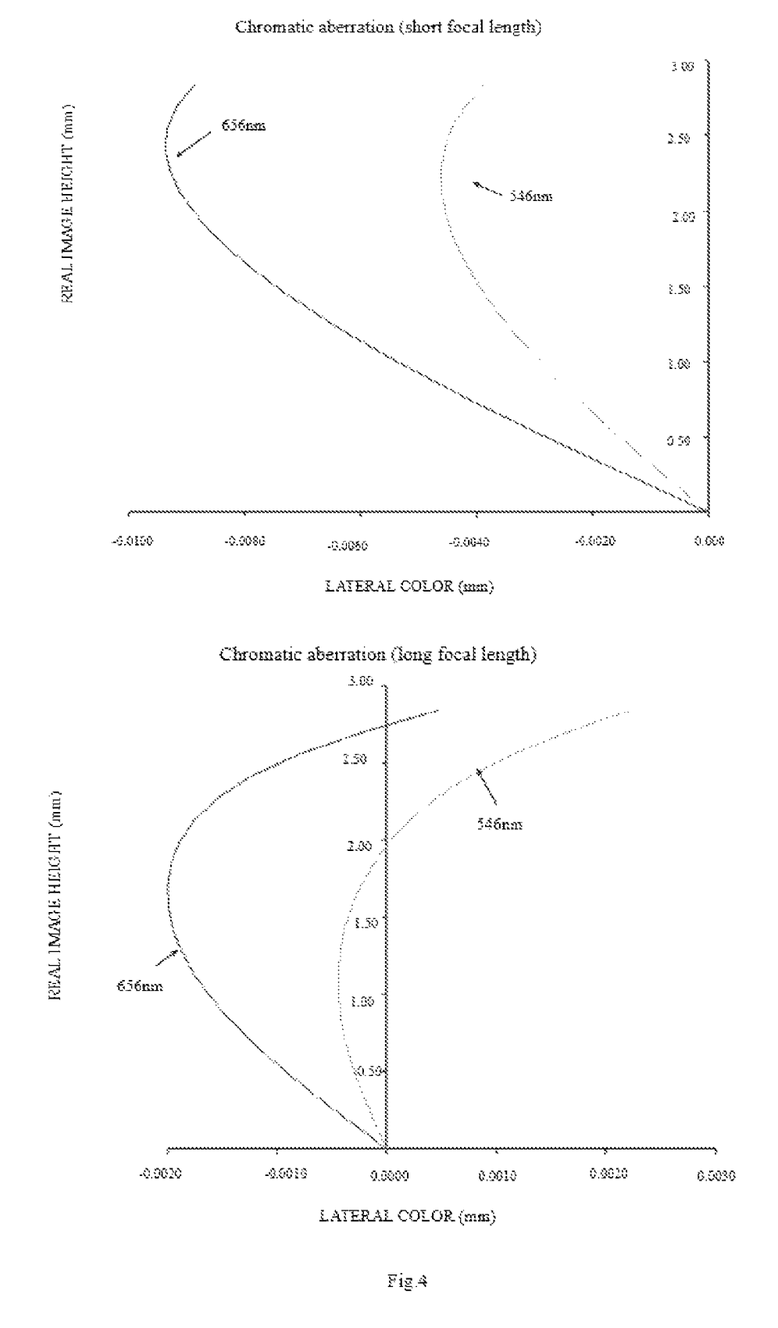
FIG. 4 schematically illustrates lateral chromatic aberration of the imaging lens assembly of FIG. 1.

FIGS. 2-4 schematically illustrates field curvature and distortion, spot diagram and lateral chromatic aberration of the imaging lens assembly as provided in the first embodiment respectively. As can be seen from FIGS. 2-4, the imaging lens assembly as provided in the first embodiment has good optical characteristics.

Embodiment 2

The imaging lens assembly as provided in a second embodiment has a configuration substantially same as that of the first embodiment and illustrated in FIG. 1, but differs in optical data. TABLE 3 and TABLE 4 show the detailed optical data of imaging lens assembly as provided in the second embodiment.

TABLE 3 and TABLE 4 are arranged similar to that of TABLE 1 and TABLE 2. Specifically, the optical data in TABLE 1 includes curvature radius, axial thickness, axial distance between lenses (short focal length optical system), refraction index and abbe number of both the surfaces of the lenses L1 to L5, the triangular prism TP and the glass filter GF. The optical data in TABLE 2 includes conic coefficient (C-coefficient) and aspherical coefficient of the lenses L1 to L5, the triangular prism TP and the glass filter GF.

TABLE 1

| | R | d | | nd | | vd |
|---|---|---|---|---|---|---|
| R11 | 178.48 | d1= | 0.75 | n1 | 1.639 | v1 | 55.450 |
| R12 | 8.059 | d2= | 1.34 | | | |
| TP | | d31= | 3.8 | nTP | 1.804 | vTP | 46.500 |
| | | d32= | 3.8 | | | |
| | | d4= | 11.68 | | | |
| R21 | −6.774 | d5= | 1.09 | n2 | 1.525 | v2 | 55.950 |
| R22 | 11.554 | d6= | 0.249 | | | |
| S1 | ∞ | d7= | 2.64 | | | |
| R31 | 2.468 | d8= | 1.093 | n3 | 1.642 | v3 | 22.409 |
| R32 | −10.958 | d9= | 0.248 | | | |
| R41 | −12.76 | d10= | 1.954 | n4 | 1.603 | v4 | 38.030 |
| R42 | 34.479 | d11= | 0.5 | | | |
| R51 | −7.629 | d12= | 2.913 | n5 | 1.525 | v5 | 55.950 |
| R52 | 17.195 | d13= | 4.435 | | | |
| R61 | ∞ | d14= | 0.55 | n6 | 1.517 | v6 | 64.167 |
| R62 | ∞ | d15= | 0.6 | | | |

In TABLE 3, d4=0.98, d11=9.354, d13=4.281 in the long focal length optical system.

TABLE 4

| | C-coefficient | aspherical coefficient | | | | |
|---|---|---|---|---|---|---|
| | k | A4 | A6 | A8 | A10 | A12 |
| R21 | 1.8790E−01 | 1.2502E−04 | 1.9511E−05 | −2.1288E−06 | 2.2412E−07 | −8.1441E−09 |
| R22 | −9.2484E+00 | 4.1571E−05 | 1.3215E−05 | −2.4885E−06 | 2.3480E−07 | −9.6570E−09 |
| R31 | 7.0067E−02 | −2.3623E−02 | 3.8686E−03 | −8.1125E−04 | 3.7967E−05 | −9.2691E−13 |
| R32 | 6.1083E+00 | −1.1889E−02 | 3.2023E−03 | −4.7744E−04 | 4.1911E−05 | −1.5612E−06 |
| R51 | 7.0137E−01 | 1.1969E−04 | 1.7282E−05 | −1.7106E−07 | | |
| R52 | −2.0946E+00 | −3.4249E−04 | 2.1463E−05 | −7.7731E−07 | | |

The relevant optical data of the imaging lens assembly in the second embodiment and the values defined in the afore-said condition formulae (1) to (11) are shown in TABLE 5 as provided in the subsequent paragraphs. As can be seen in TABLE 5, the imaging lens assembly in the second embodiment also satisfies the aforesaid condition formulae (1) to (11).

In the first embodiment, the F-number of the imaging lens assembly is in a range from 2.40 to 3.15, the focal length is in a range from 4.91 to 11.2, the full field angle is in a range from 28° to 60°, the refraction index of the triangular prism TP is 1.804, which is capable of reflecting incident light with an incident angle greater than 33.66° to improve the imaging range of the imaging lens assembly.

Furthermore, similar to the first embodiment, in the imaging lens assembly as provided in the second embodiment, the focal power of the front fixing unit (the first lens L1) is negative, the focal power of the magnification unit (the second lens L2) is positive, the focal power of the compensation unit (the third lens L3 and the fourth lens L4) is negative, and the focal power of the fifth lens L5 is positive. With this configuration, when the imaging lens assembly operates in a zooming process, i.e., converting from a short focal length to a long focal length, the magnification unit (the second lens L2) moves towards the triangular prism TP gradually, and the compensation unit (the third lens L3 and the fourth lens L4) moves away from the image plane gradually.

Figure 5:
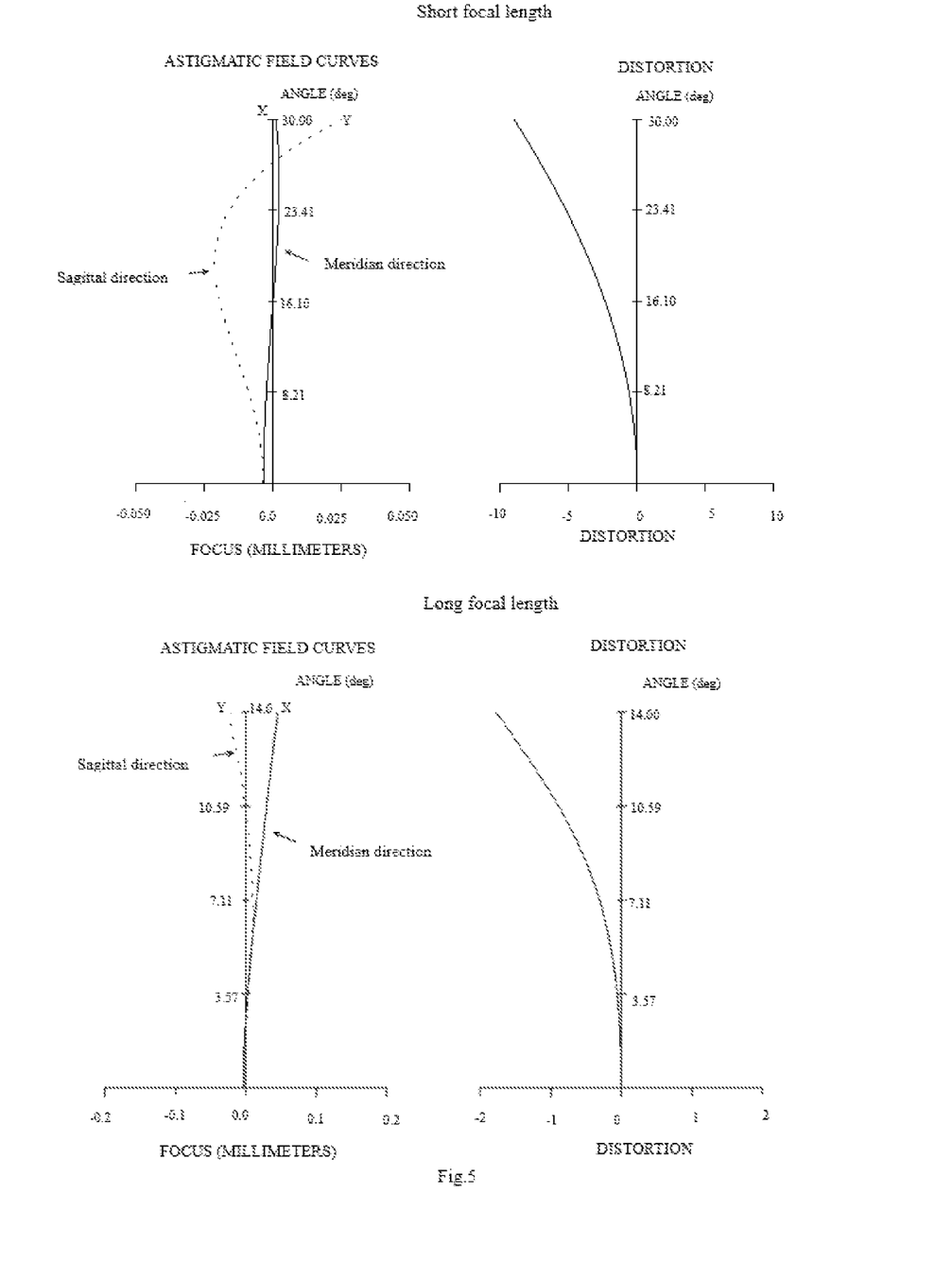
FIG. 5 schematically illustrates field curvature and distortion of an imaging lens assembly according to a second embodiment of the present disclosure.
Figure 6:
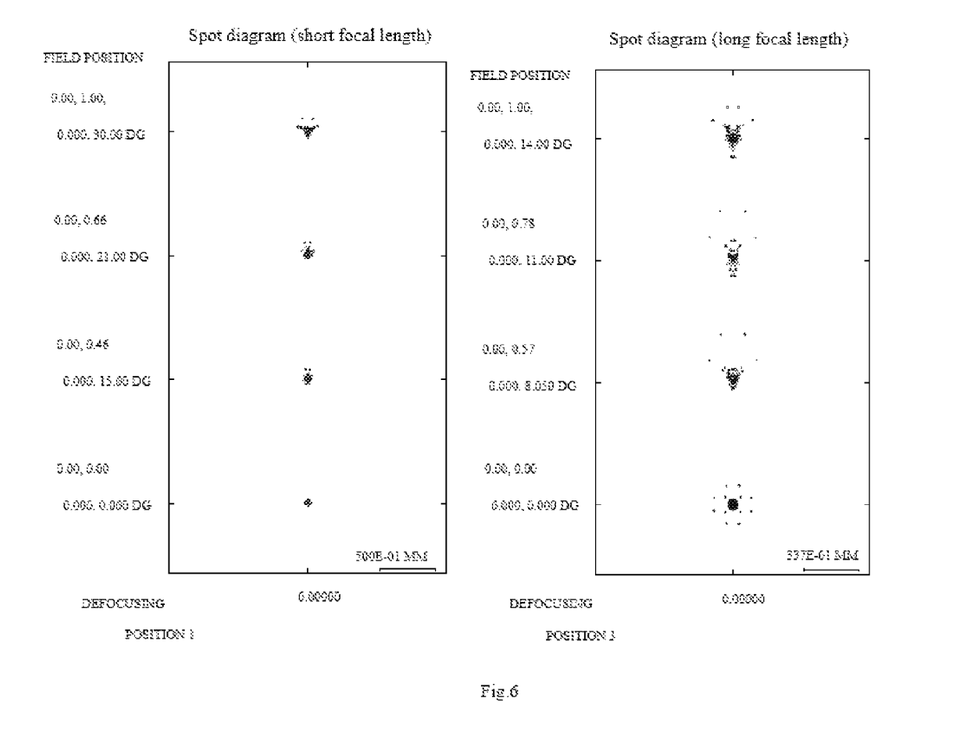
FIG. 6 schematically illustrates a spot diagram of an imaging lens assembly according to a second embodiment of the present disclosure.
Figure 7:
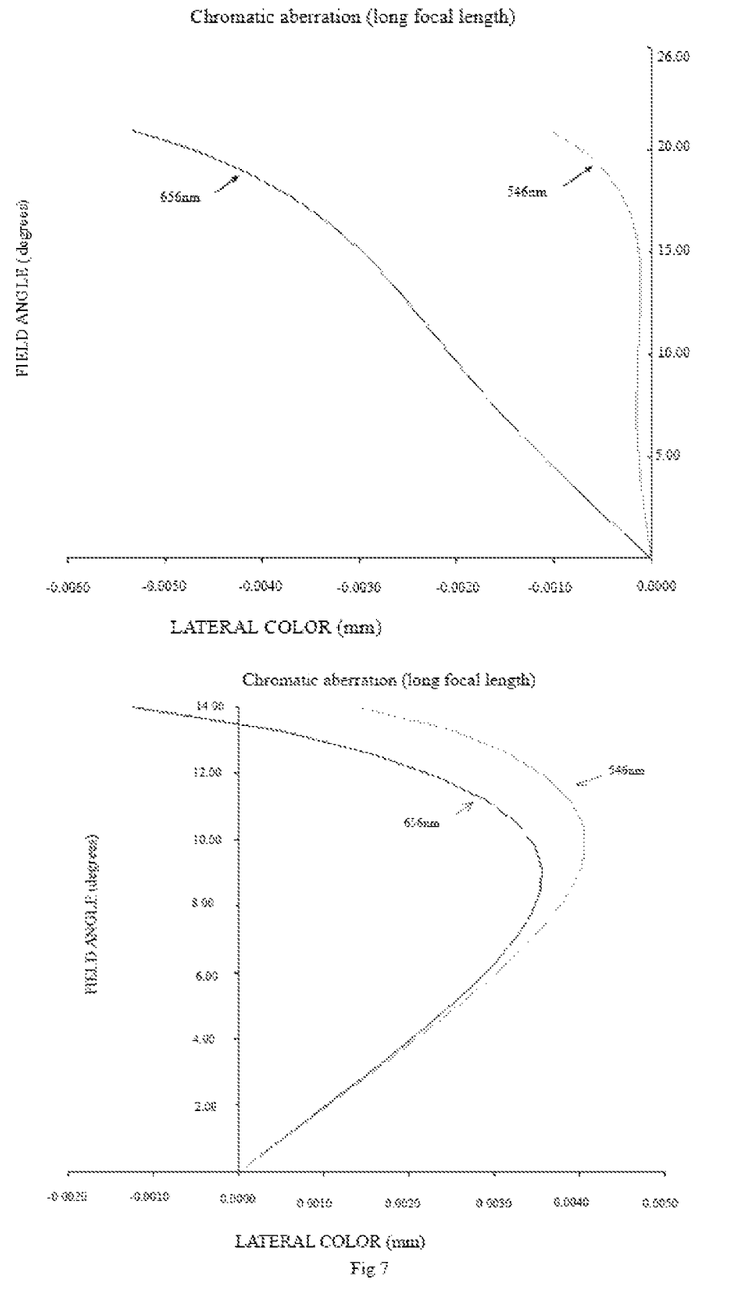
FIG. 7 schematically illustrates lateral chromatic aberration of an imaging lens assembly according to a second embodiment of the present disclosure.

FIGS. 5-7 schematically illustrates field curvature and distortion, spot diagram and lateral chromatic aberration of the imaging lens assembly as provided in the second embodiment respectively. As can be seen from FIGS. 5-7, the imaging lens assembly as provided in the second embodiment also has good optical characteristics.

TABLE 5 shows the values of the imaging lens assembly in relevant to the condition formulae (1) to (11) according to both the first embodiment and the second embodiments.

TABLE 5

| | Embodiment 1 | Embodiment 1 | Remark |
|---|---|---|---|
| F/#s | 2.4 | 2.4 | condition formulae (1) |
| F/#l | 3 | 3.15 | condition formulae (2) |
| nTP | 1.804 | 1.804 | condition formulae (3) |
| n3 | 1.651 | 1.642 | condition formulae (4) |
| v3 | 21.51 | 22.41 | condition formulae (5) |
| |f2/f34| | 0.32 | 0.49 | condition formulae (6) |
| |f1/fs| | 1.9 | 2.3 | condition formulae (7) |
| D1 | 9.64 | 9.75 | condition formulae (8) |
| BF | 5.5 | 5 | condition formulae (9) |
| M1 | 6.84 | 10.7 | condition formulae (10) |
| M2 | 5.53 | 2 | condition formulae (11) |

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An imaging lens assembly, comprising:
a front fixing unit with a first lens;
a triangular prism;
a magnification unit with a second lens;
an aperture stop;
a compensation unit with a third lens and a fourth lens; and
an object lens unit with a fifth lens;
wherein the front fixing unit, the triangular prism, the magnification unit, the aperture stop, the compensation unit and the object lens unit are arranged in that order along an light incident direction; the triangular prism is configured for changing a light transmitting direction, the magnification unit and the compensation unit are configured for performing continuous focal length switching, and the object lens unit is configured for performing focusing in different distance conditions;
wherein the first lens is a meniscus convex lens, the second lens is a biconvex positive lens, the third lens is a biconcave lens, the fourth lens is a meniscus convex lens, and the fifth lens is a biconvex lens; and
the imaging lens assembly further satisfies following condition formulae (1) and (2):

$$1.8 < F/\#s < 2.5 \qquad (1);$$

$$2.8 < F/\#l < 3.2 \qquad (2);$$

wherein F/#s refers to an F-number of a short focal length optical system, and F/#l refers to an F-number of a short long focal length optical system.

2. The imaging lens assembly of claim 1, further satisfying following condition formulae (3) to (5):

$$1.75 \leq nTP \leq 1.85 \qquad (3)$$

$$1.60 \leq n3 \leq 1.66 \qquad (4)$$

$$20.5 \leq v3 \leq 23 \qquad (5)$$

wherein nTP refers to a refractive index of the triangular prism, n3 refers to a refractive index of the third lens, and v3 refers to a dispersion coefficient of the third lens.

3. The imaging lens assembly of claim 1, further satisfying following condition formulae (6) to (7):

$$0.32 < |f2/f34| < 0.50 \qquad (6);$$

$$1.55 < |fl/fs| < 3.55 \qquad (7);$$

wherein f2 refers to a focal length of the magnification unit, f34 refers to a focal length of the compensation unit, fl refers to a focal length of the long focal length optical system, and fs refers to a focal length of the short focal length optical system.

4. The imaging lens assembly of claim 3, further satisfying following condition formulae (8) to (9):

$$D1 < 10 \text{ mm} \qquad (8);$$

$$BF < 6 \text{ mm} \qquad (9);$$

wherein D1 refers to an overall lateral distance from the first lens of the front fixing unit to a turning part of the triangular prism, and BF refers to a back focal length of the imaging lens assembly.

5. The imaging lens assembly of claim 3, further satisfying following condition formulae (10) to (11):

$$M1 < 11 \text{ mm} \qquad (10);$$

$$M2 < 6 \text{ mm} \qquad (11);$$

wherein M1 refers to a motion distance of the magnification unit, and M refers to a motion distance of the compensation unit.

* * * * *